No. 697,800. Patented Apr. 15, 1902.
C. F. BURNS.
VEHICLE RUNNING GEAR.
(Application filed Sept. 7, 1900.)
(No Model.) 2 Sheets—Sheet 1.
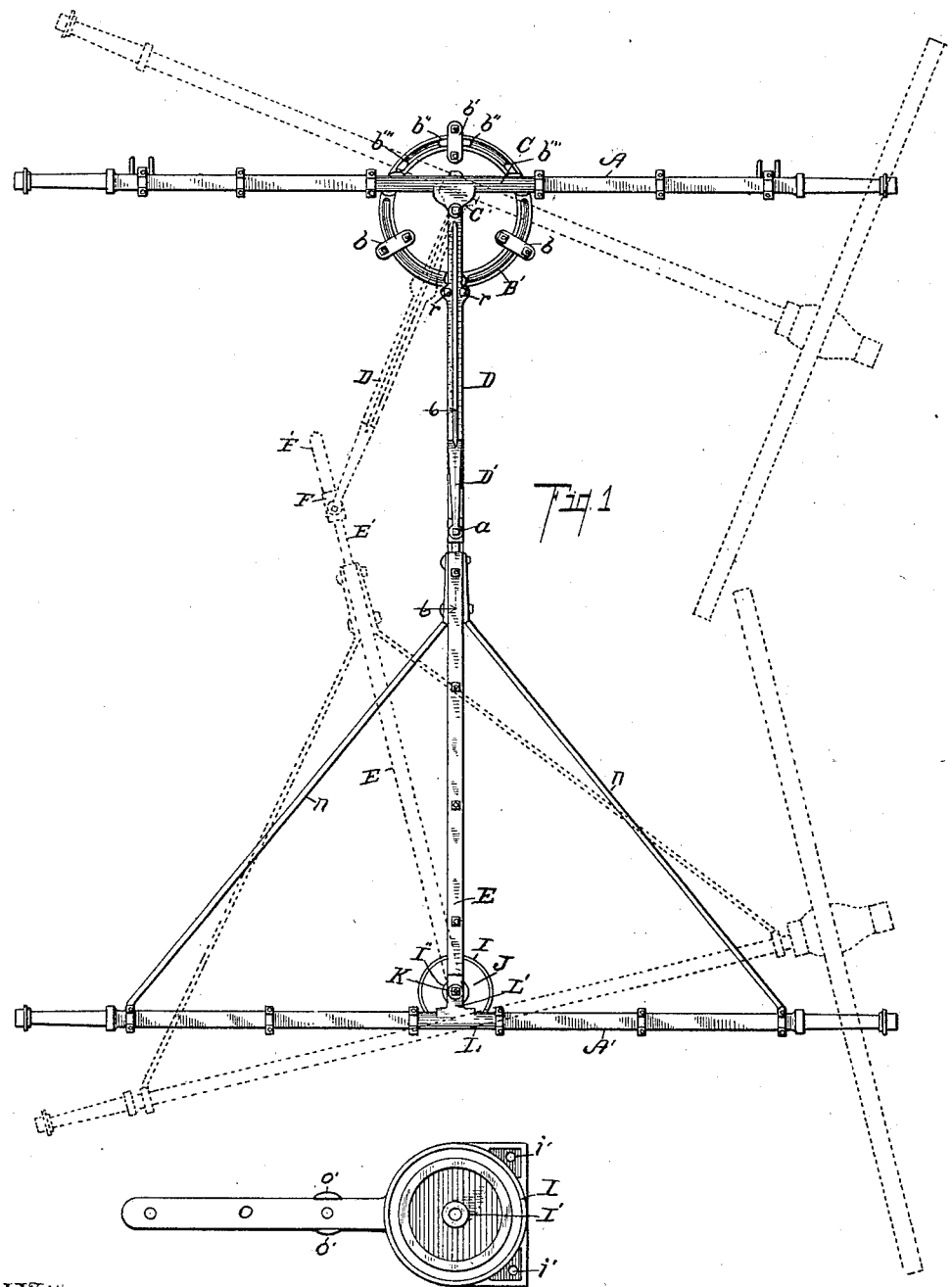
Witnesses:
A. E. Houghton
Otis A. Earl
Inventor,
Charles F. Burns
By Fred L. Chappell
Att'y

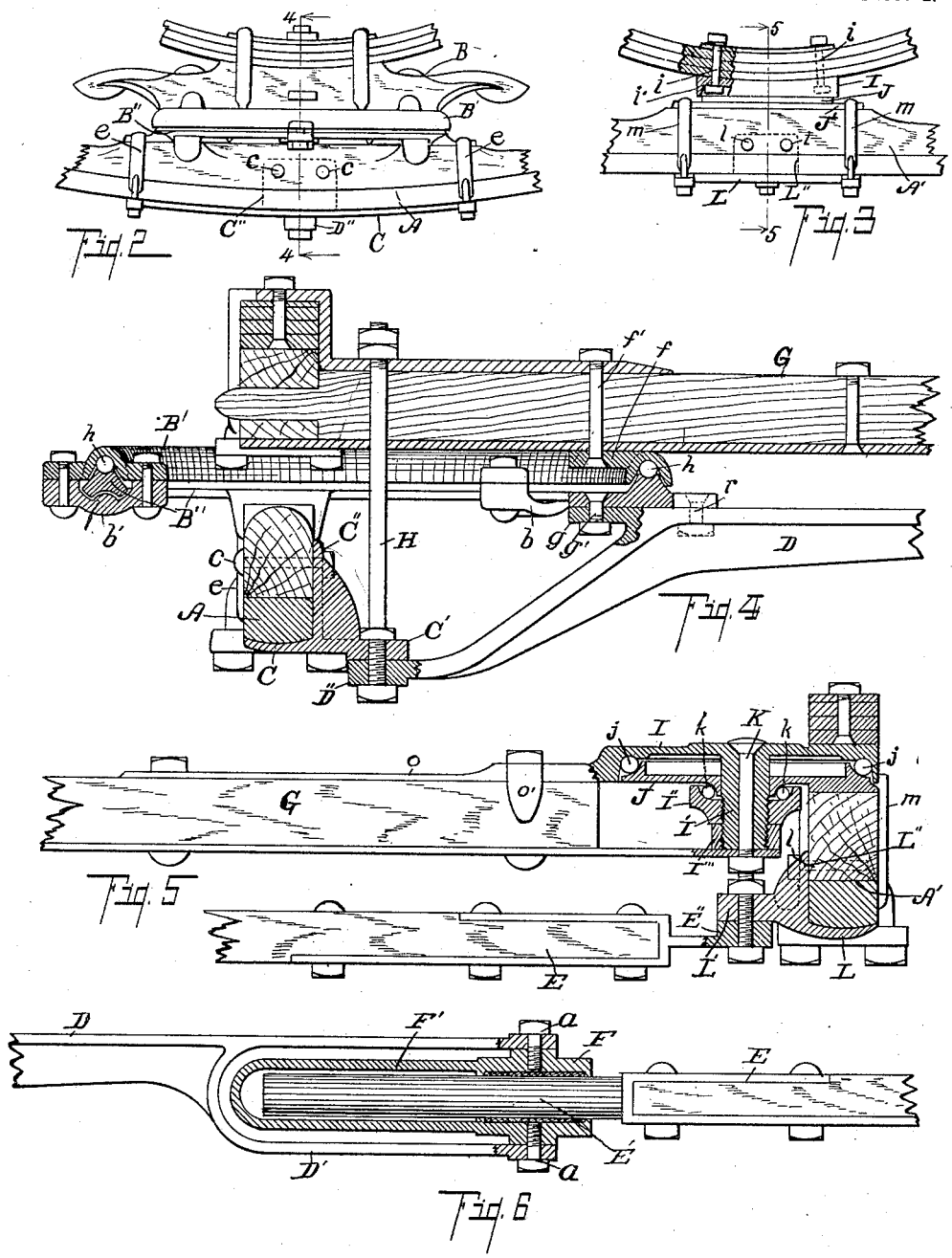

UNITED STATES PATENT OFFICE.

CHARLES F. BURNS, OF KALAMAZOO, MICHIGAN.

VEHICLE RUNNING-GEAR.

SPECIFICATION forming part of Letters Patent No. 697,800, dated April 15, 1902.

Application filed September 7, 1900. Serial No. 29,259. (No model.)

*To all whom it may concern:*

Be it known that I, CHARLES F. BURNS, a citizen of the United States, residing at the city of Kalamazoo, in the county of Kalamazoo and State of Michigan, have invented certain new and useful Improvements in Vehicle Running-Gears, of which the following is a specification.

This invention relates to improvements in running-gears for vehicles, the same being in many respects and improvement on the structure appearing in my Patent No. 619,539, issued on the 14th day of February, 1899, although there are several features of the invention which are independent of that device and are applicable to the running-gears of vehicles generally.

The objects of this invention are, first, to provide improved pivotal connections between the parts which are safely retained together and which at the same time make use of ball-bearings to reduce the friction; second, to provide in such a structure improved connections between the reach and the axle which shall not depend for their main support on a king-bolt; third, to provide an improved arrangement of the parts whereby the ball-bearings will be perfectly protected from the elements and dust and will serve not only in relieving the friction, but in retaining the parts in their proper pivotal relation to each other; fourth, to provide an improved connection between the ends of the swinging reaches which shall properly protect the parts from wear, suitably incase the same, and prevent any possible injury to other adjacent parts either from their contacting with the same or from the escape of lubricant; fifth, to provide an improved connection and arrangement of the circles or fifth-wheels in a vehicle running-gear.

Still further objects will definitely appear in the detailed description to follow.

I accomplish the objects of my invention by the devices and means described in this specification.

The invention is clearly defined and pointed out in the claims.

A structure embodying the features of my invention is fully illustrated in the accompanying drawings, forming a part of this specification, in which—

Figure 1 is an inverted plan view of the running-gear of a vehicle, the operation of which and the relation of the wheels thereon being indicated by the dotted lines. Fig. 2 is an enlarged detail front elevation of the forward circle and adjacent parts. Fig. 3 is an enlarged detail rear elevation of the rear circle and pivotal connection and adjacent parts. Fig. 4 is an enlarged detail longitudinal sectional elevation through the forward circle, taken on a line corresponding to line 4 4 of Fig. 2. Fig. 5 is an enlarged detail longitudinal sectional elevation of the rear coupling, taken on a line 5 5 of Fig. 3. Fig. 6 is a detail elevation view of the coupling between the swinging reaches, partially in section on line 6 6 of Fig. 1. Fig. 7 is an enlarged detail inverted plan view of the top member of the rear reach-coupling.

In the drawings all of the sectional views are taken looking in the direction of the little arrows at the ends of the section-lines, and similar letters of reference refer to similar parts throughout the several views.

Referring to the lettered parts of the drawings, A is the forward axle, and A' the rear axle, of my improved vehicle running-gear. B is the front head-block, and I the rear head-block and circle-plate which supports the springs and vehicle-body above. These head-blocks are joined together by a straight bar-reach G, although this reach can be made in as many branches as may be desired or required.

To the front axle is secured an arm D, which extends rearwardly, where it is bifurcated at D' into an upper and lower member, and a sleeve F, having a cap F', is pivoted on vertical pivots or bolts *a a*. An arm E is secured to the rear axle and extends forwardly, terminating in a round shaft E', which extends into and has bearings in the sleeve F, so that when the front axle is turned it acts upon the rear axle and the wheels swing into the position indicated by the dotted lines in Fig. 1. The arm E is suitably braced by the braces *n n*, extending to the rear axle at each side. A suitable packing is provided in the sleeve F to prevent rattling or noise and the escape of lubricant. The lower circle of the front gear is securely bolted by the bolts *r* to the arm D and by suitable clips *e e* to the axle A, suitable fingers extending to each side of the circle to be engaged by the said clips. A bar C is secured to the under side of the axle A and has a bracket C' extending rearwardly therefrom, and an upwardly-projecting flange C'' is bolted to the wood of the axle by the bolts c c. The bar C is secured and held in position by the same clips e which retain the circle B'' on the upper side. The circle B'' is in cross-section narrow at the top and broad at the bottom. A ball-race is formed on the upper narrower surface. The upper circle B' is secured to the head-block by suitable clips and to the reach G by a bolt f', extending through an ear f, projecting inwardly from the circle.

Circles are retained positively in engaging position with each other by small yokes b b b', which are bolted to projecting ears on the upper circle and embrace the lower circle at intervals of its circumference. The under part of the lower circle B'' is grooved to receive a guiding portion b'' on the yoke b' and guides b''' on the axle A. A bolt H extends through an eye in an extension D'' of the arm D, through the bracket C', and through the forward end of the reach G, the part D'' and the bracket C' being positively clamped together thereby. The bolt turns as a journal in the reach G, being provided with nuts at the upper end to draw the parts close together and take up all slack in the bearing. This affords a very rigid coupling with a broad base, in which the friction is reduced to a minimum by the ball-bearings interposed. A ball-race is formed in the groove on the under side of the circle B', which fits down and caps over the lower circle B''. This effectually prevents any water or dirt falling into the bearing and permits the ready escape of any dust or other obstruction which may enter the same, thus keeping the bearing perfectly clean under all circumstances.

The coupling at the rear consists of a turntable or fifth-wheel of special construction for use in connection with the remaining parts. Secured to the rear end of the reach G is a top plate I, which forms on its upper side the rear head-block, the spring being secured thereto by means of bolts i, extending through the same. The under side of this plate is provided with a circular ball-race, and a post I' extends down from the center of the circle of the ball-race in front of the axle. On the upper side of the axle A' is secured a bracket carrying a circle J at its upper end, which is provided with a ball-race corresponding to the ball-race of the plate I on its upper side, the balls j being inserted at this point to relieve the friction, the upper circle capping down over the lower one to protect the same and conceal it from view. On the under side of the plate J is a ball-race, close to the center of the same, the said plate being perforated to receive the post I' of the upper plate. The lower end of the post is screw-threaded and receives a screw-threaded nut I'', which is flanged and provided with a ball-race for retaining the balls k k against the ball-race on the under side of the plate J. A jam-nut I''' serves to lock this ball-bearing device in position. The plate on the under side of the reach G extends out beneath the jam-nut I'''. A bar L is underneath the axle A', and the clips m m, which hold the circle J in position, also embrace this bar. A bracket L' extends forwardly from the bar L and is perforated to receive the rear pivot-bolt K. The rear end of the reach is extended at E'' for clamping the same in position. The bolt K extends down through the center of the plate I, the post I', bracket L', and rear end E' of the arm, retaining all of the parts securely together and yet permitting the axle, with its connected arm E, to freely swing.

I have thus carefully described the various parts of my improved running-gear so that their operation and function will be fully understood. It will be noted that substantially the same coupling and principle is adopted at both the front and the rear, the same being especially adapted to the location in each instance. Where I have reduced the diameter of the circle at the rear I have increased the strength of the same by doubling the bearings, overcoming the friction by insertion of balls in suitable ball-races. I have shown in each instance special retaining means for preventing the separation of the members of the turning parts. Other retaining means might be provided, and in the case of vehicles of sufficient weight the weight of the body is sufficient for the purpose.

Having thus described my invention, what I claim as new, and desire to secure by Letters Patent, is—

1. In a running-gear for a vehicle, the combination of the front and rear head-blocks; a rigid reach connecting the same; circles secured to the under side of said front and rear head-blocks, the front circle having its center to the rear of the front head-block and the rear circle having its center to the front of the rear head-block; ball-races grooved into the under side of said circles; the front axle with a suitable circle clipped to the same, corresponding to the circle on the front head-block, the same projecting into the groove of the circle above and being provided with a suitable ball-race; a bolt extending down through the reach and through a bracket on the front axle at the center of the said bearing-circle; an arm D secured to the said bolt and the under circle and extending rearwardly; and a pivoted sleeve F with cap F' carried on the rear end of said arm; a circle carried by the rear axle and fitting into the circle on the said rear head-block being overcapped thereby; an arm E terminating in a round journal portion E' at its forward end, fitting within the sleeve F and a vertical bolt K extending down through the plate carried by the rear head-block through a bracket on said rear axle and the rear end E'' of the arm E, retaining the same securely together, all coacting for the purpose specified.

2. In a running-gear for a vehicle, the combination of the front and rear head-blocks; a rigid reach connecting the same; circles secured to the under sides of said front and rear head-blocks, the front circle having its center to the rear of the front head-block and the rear circle having its center to the front of the rear head-block; ball-races grooved into the under sides of said circles; the front axle with a suitable circle clipped to the same corresponding to the circle on the front head-block, the same projecting into the groove of the circle above and being provided with a suitable ball-race; a bolt extending down through the reach and through a bracket on the front axle at the center of the said bearing-circle; an arm D secured to said bolt and the under circle and extending rearwardly; and a pivoted sleeve F carried on the rear end of said arm; a circle carried by the rear axle and fitting into the circle on the said rear head-block being overcapped thereby; an arm E terminating in a round journal portion E' at its forward end, fitting within the sleeve F and a vertical bolt K extending down through the plate carried by the rear head-block through a bracket on said rear axle and the rear end E'' of the arm E, retaining the same securely together, all coacting for the purpose specified.

3. In a running-gear for vehicles, the combination of the front and rear head-blocks; the axles pivoted beneath the same carrying arms extending toward each other, one of which arms has a sleeve F having a cap F' pivoted thereto; and a bolt on the opposite arm extending into the sleeve to afford a sliding and swinging connection between the parts, for the purpose specified.

4. In a fifth-wheel or coupling for a vehicle, the combination with the head-block B; the reach G; the complete circle B', secured to the under side thereof by suitable clips and with a circular ball-race in a groove on its under side, said circle being located with its center to the rear of the axle; the lower circle B'' being narrowed at the top with a ball-race therein, secured by suitable clips to the axle; a bar C secured to the axle having the brackets C' projecting rearwardly therefrom; retaining-bolt H extending through the reach G and through the bracket C' carried by the axle; and yokes, $b$, $b$, $b'$ with extensions $b''$, $b'''$, fitting in a groove on the under side of the lower circle B'', all coacting substantially as described for the purpose specified.

5. In a fifth-wheel or coupling for a vehicle, the combination with the head-block B; the reach G; the complete circle B' secured to the under side thereof by suitable clips and with a circular ball-race in a groove on its under side, said circle being located with its center to the rear of the axle; the lower circle B'' being narrowed at the top with a ball-race therein, secured by suitable clips to the axle; a bar C secured to the axle having the brackets C' projecting rearwardly therefrom; retaining-bolt H extending through the reach G and through the bracket C' carried by the axle, all coacting substantially as described for the purpose specified.

6. In a fifth-wheel or coupling for vehicles, the combination of a head-block; a reach; an upper circle having a cone-shaped groove in its under surface, the bottom of said groove being circular in cross-section, secured beneath the said reach; an axle; an under circle, the sides of the upper portion of which are made to closely fit the sides of the groove in the said upper circle to form a bearing therewith, and also provided with a ball-race in its upper edge, secured to said axle, for the purpose specified.

7. In a fifth-wheel or coupling for vehicles, the combination of a head-block; a reach; and an upper circle having a cone-shaped groove in its under surface, the bottom of said groove being circular in cross-section, secured beneath the said reach; an axle; an under circle, the sides of the upper portion of which are made to closely fit the sides of the groove in the said upper circle to form a bearing therewith, as specified.

8. In a coupling for a vehicle the combination of the reach G; the plate I with a circular ball-race on a groove on its under side with a downwardly-extending post I' with a head-block above; the axle; the plate J secured by the edge to the upper side of said axle, extending under the plate I and provided with a journal-bearing to embrace the post I' and having a ball-race on its upper side toward the periphery and a ball-race on its lower side toward the center; the nut I'' with a ball-race on its upper side, screw-threaded to engage the post I'; jam-nut I''' for locking the said ball-bearing nut I'' in position; a bar L with a bracket L' secured to the reach A' and a tie-bolt K extending centrally through the bearing-plates and bracket L' to retain the parts pivotally together, for the purpose specified.

9. In a coupling for a vehicle the combination of a reach; the plate I with a circular ball-race on a groove on its under side with a downwardly-extending post I' with a head-block above; the axle; the plate J secured by the edge to the upper side of said axle, extending under the plate I and provided with a journal-bearing to embrace the post I' and having a ball-race on its upper side toward the periphery and a ball-race on its lower side toward the center; the nut I'' with a ball-race on its upper side screw-threaded to engage the post I'; jam-nut I''' for locking the said ball-bearing nut I'' in position, for the purpose specified.

In witness whereof I have hereunto set my hand and seal in the presence of two witnesses.

CHARLES F. BURNS. [L. S.]

Witnesses:
ALICE E. HOUGHTON,
OTIS A. EARL.